United States Patent Office 3,123,391
Patented Mar. 3, 1964

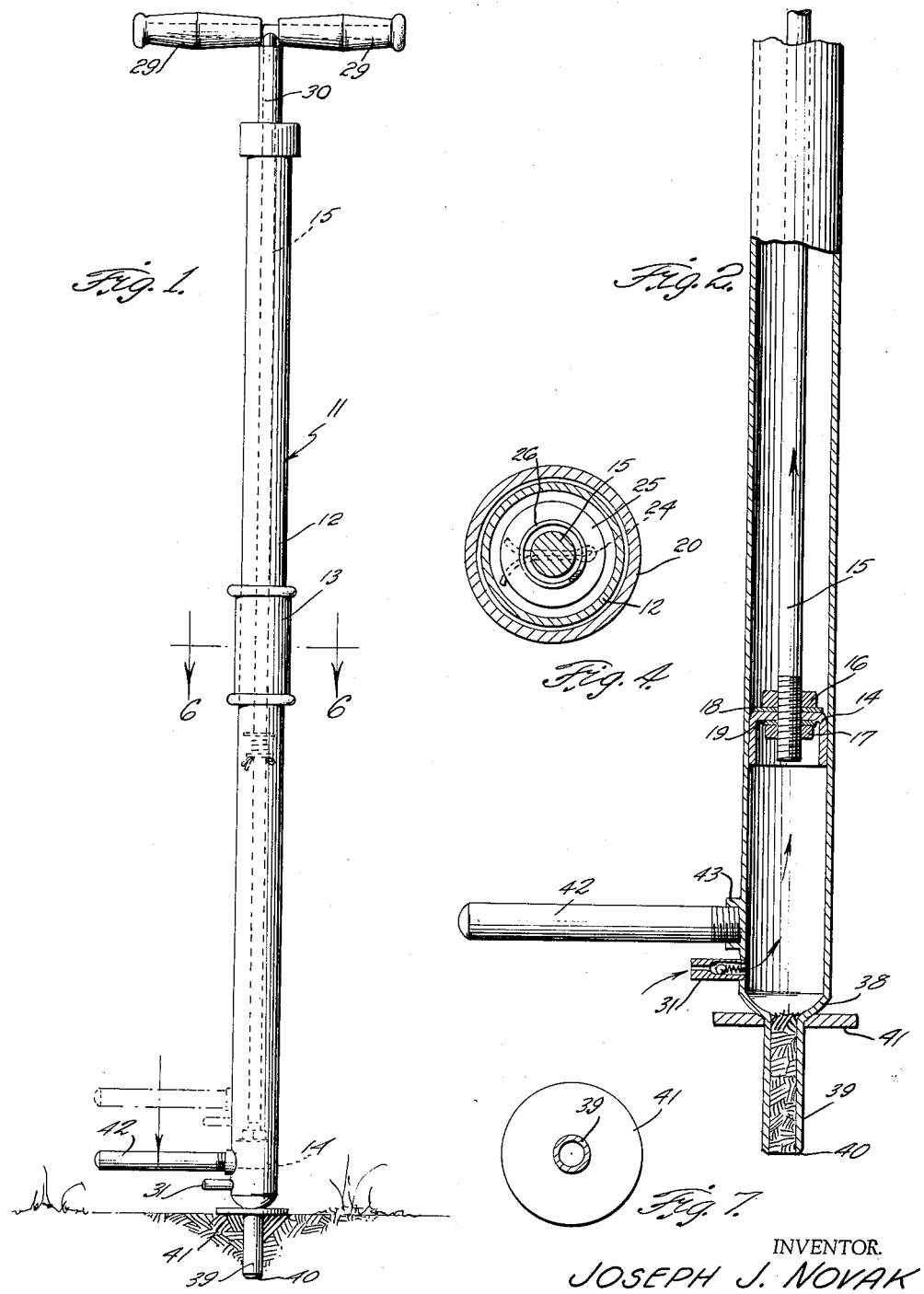
March 3, 1964 — J. J. NOVAK — 3,123,391
LAWN AERATOR
Filed Oct. 23, 1962 — 2 Sheets-Sheet 1
INVENTOR.
JOSEPH J. NOVAK

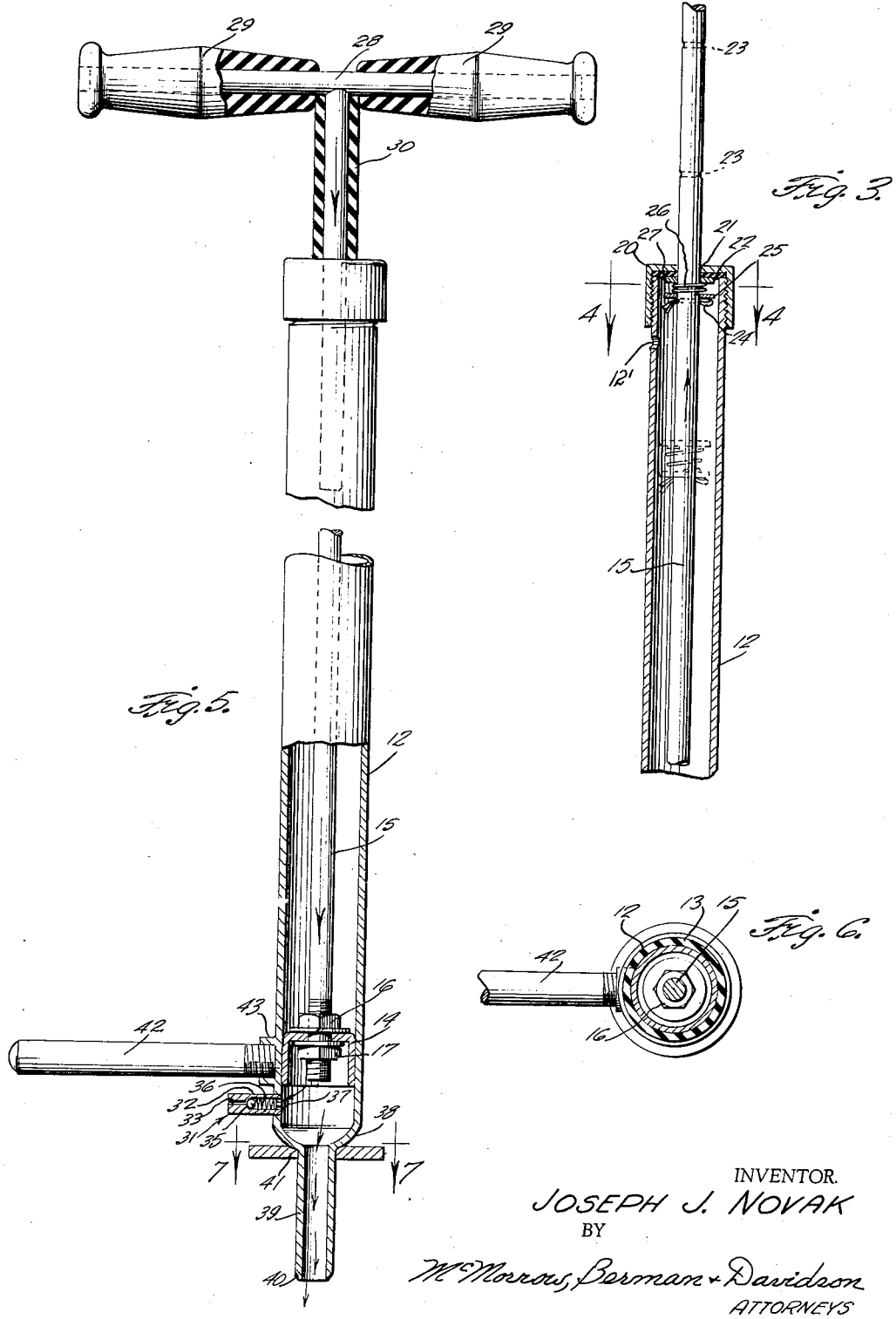

3,123,391
LAWN AERATOR
Joseph J. Novak, 3603 Stanfield Drive, Parma, Ohio
Filed Oct. 23, 1962, Ser. No. 232,385
5 Claims. (Cl. 294—50.7)

This invention relates to apparatus for aerating the soil, and more particularly to a device for aerating lawns and for extracting weeds therefrom.

A main object of the invention is to provide a novel and improved device for aerating the soil, particularly for aerating lawns and for extracting weeds, said device being simple in construction, being easy to operate, and involving relatively few parts.

A further object of the invention is to provide an improved device for penetrating the soil and for forming holes therein for the purpose of aeration, said device being provided with means for efficiently discharging the extracted soil therefrom after it has been withdrawn from the ground, the device being relatively inexpensive to manufacture, being durable in construction, and being easily adjustable to provide a desired length of operating stroke thereof.

A still further object of the invention is to provide an improved aerating device for forming aeration holes in lawns and similar areas, for the purpose of exposing the soil to air and to provide recesses to retain fertilizer and similar nutritive material, the device being compact in size, being light in weight, and having its parts arranged so that they will not be damaged during use of the device or during transportation or storage thereof.

Further objects and advantages of the invention will become apparent from the following description and claims, and from the accompanying drawings, wherein:

FIGURE 1 is an elevational view of an improved soil aerating device constructed in accordance with the present invention shown embedded in the soil preparatory to forming an aeration hole in the soil.

FFIGURE 2 is an enlarged fragmentary elevational view, partly in vertical cross section, of the lower portion of the device shown in FIGURE 1.

FIGURE 3 is an enlarged vertical cross sectional view of the upper portion of the pump cylinder and associated parts of the device of FIGURE 1.

FIGURE 4 is an enlarged horizontal cross sectional view taken substantially on the line 4—4 of FIGURE 3.

FIGURE 5 is an enlarged fragmentary side elevational view, partly in vertical cross section, of the device of FIGURE 1 shown with its plunger in its lower position at the end of a soil-discharging stroke.

FIGURE 6 is an enlarged horizontal cross sectional view taken substantially on the line 6—6 of FIGURE 1.

FIGURE 7 is a horizontal cross sectional view taken substantially on the line 7—7 of FIGURE 5.

Referring to the drawings, 11 generally designates an improved device for aerating the soil constructed in accordance with the present invention. The device 11 comprises an elongated pump cylinder 12 provided at its intermediate portion with a rubber gripping sleeve 13 which serves as a means for manually grasping the intermediate portion of the device during its use.

Slidably and sealingly mounted inside the pump barrel 12 is the cup-shaped, downwardly facing leather piston 14 which is centrally secured to the lower end portion of a piston rod 15, as by means of the respective clamping nuts 16 and 17 with rigid washers 18 and 19 interposed between the clamping nuts and the circular main body portion of the cup-shaped flexible piston 14.

The cylinder 12 is provided with the annular top cap 20 having a central aperture 21 through which the piston rod 15 slidably extends, a sealing gasket 22 being provided between the main wall portion of cap 20 and the top rim of the cylinder barrel 12, as is clearly shown in FIGURE 3. Cylinder 12 is provided with a vent opening 12' subjacent cap 20.

The piston rod 15 is provided with a plurality of spaced transverse apertures 23 and engaged through a selected aperture is a cotter pin 24 which underlies a stop washer 25 mounted on the piston rod. A coiled spring 26 surrounds the piston rod immediately above the washer 25, and a further washer 27 surrounds the piston rod immediately above the coiled spring 26, the upper washer 27 being engageable with the sealing gasket 22 and cooperating with the spring 26 and the lower washer 25 to yieldably limit the upward movement of piston rod 15 to a top stroke extremity determined by the selection of the aperture 23. When the cotter pin 24 is disposed in the lowermost aperture 23 the pump device will have a relatively long suction stroke, whereas the maximum length of the suction stroke can be shortened by locating the cotter pin 24 in another aperture 23.

The piston rod 15 is provided at its top end with a transversely extending handle assembly comprising a horizontal cross bar 28 rigidly secured at its mid portion to the top end of the rod 15, the cross bar being provided with the rubber gripping handles 29, 29. The upper portion of the piston rod 15 is provided subjacent the cross bar 28 with a rubber sleeve 30 which serves as a resilient stop for limiting the downward movement of the piston rod. The lower end of the sleeve 30 is engageable with the cap member 20 when the handle assembly is moved downwardly, thus restraining the piston rod in its downward movement to a lowermost position such as that illustrated in FIGURE 5, wherein the cup-shaped piston 14 is spaced only a short distance above the bottom end of the cylinder.

An air-intake check valve 31 is provided in the lower end portion of the cylinder immediately below the lowermost position of the cup-shaped piston 14, as shown in FIGURE 5, the check valve comprising a laterally projecting conduit 32 formed with an air intake bore 33 and an enlarged axial cavity 34 communicating with the bore 33 and with the lower portion of the cylinder 12. A check valve ball 35 is disposed in the cavity 34, being biased against the inner end of the air admission passage 33 by a coiled spring 36. The coiled spring 36 bears on on an annular seat 37 provided at the opposite end of bore 34, so that the ball 35 is normally urged into seating engagement so that air contained in the cylinder cannot escape through the check valve 31. However, when the piston is moved upwardly, suction is produced in the cylinder so that atmospheric air unseats the ball 35 and enters the lower portion of the cylinder.

The cylinder 12 is formed at its bottom end with a downwardly convergent portion 38 which terminates in a vertical, depending cylindrical tube 39 having a sharpened bottom rim 40. A stop washer 41 is rigidly secured around the top end portion of the tube 39, serving as a stop means to limit the penetration of the tube 39 into the soil.

Designated at 42 is a laterally extending arm which is threadedly secured in an internally threaded collar portion 43 rigidly secured to the lower portion of the cylinder 12 immediately above and in the same vertical plane as the check valve assembly 31. From FIGURE 5 it will be seen that the arm 42 overlies the check valve assembly and serves as a protective guard means for the check valve assembly to prevent damage thereto during the use of the device or during transportation or storage. It will be further noted that the outwardly extending stop flange 41 is of relatively large diameter and underlies a substantial portion of the check valve so that it also serves as a protective means for said check valve.

In using the device, it is first inserted in the soil in a vertical position and forced downwardly therein by exerting force on the laterally extending arm 42, for example, by stepping on said arm, until further penetration is prevented by the engagement of the flange 41 with the surface of the soil. The device is then extracted from the soil, using the handle 13 as a means for gripping same, after which the pump handle is pulled outwardly, producing suction in the lower portion of the cylinder and allowing air to enter said lower portion through the check valve assembly 31. By then pushing forwardly on the pump handle, the air pressure in the cylinder may be built up to a sufficient value to discharge the plug of soil from the tube 39 into a suitable receptacle, or onto the lawn.

The device may also be employed as a weed extractor by following the same procedure, except that the tube 39 is inserted over the crown of the weed so that the main portion of the weed is forced into the tube when the device is pushed downwardly to cause the tube to penetrate the soil. The weed may be then extracted by disengaging the device from the soil and may deposited in a suitable receptacle by operating the pump in the same manner as above described, namely, by first pulling the pump handle outwardly to fill the lower portion of the pump cylinder with air, and by then pushing the pump handle inwardly to build up air pressure sufficient to eject the material from the tube 39 into the collection receptacle.

As above explained, the effective stroke of the pump portion of the device may be adjusted in accordance with the needs of the operator by placing the cotter pin 24 in a suitable opening 23. The cap 20 is easily unscrewed from the top end of the pump cylinder to allow the piston and piston rod to be removed from the cylinder and to facilitate the desired adjustment of the piston stroke.

While a specific embodiment of an improved device for aerating the soil has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for aerating the soil comprising an elongated pump cylinder, a piston in said cylinder, a piston rod connected to said piston and extending through the top end of the cylinder, an operating handle on said piston rod, a ground-penetrating tube secured axially to the other end of the cylinder in communication therewith, said tube being adapted to be forced into the soil and to form a plug of soil therein which is extracted when the tube is withdrawn from the soil, and an air-admitting check valve on the lower portion of the cylinder below the piston adapted to admit air responsive to an upward suction stroke of the piston after the plug is formed in the tube and the tube is withdrawn from the soil and to close when the piston is moved downwardly to compress the admitted air, the piston being movable downwardly to increase the pressure of the admitted air, whereby the plug may be expelled from the tube.

2. A device for aerating the soil comprising an elongated pump cylinder, a piston in said cylinder, a piston rod connected to said piston and extending through the top end of the cylinder, an operating handle on said piston rod, a ground-penetrating tube secured axially to the other end of the cylinder in communication therewith, said tube being adapted to be forced into the soil and to form a plug of soil therein which is extracted when the tube is withdrawn from the soil, an air-admitting check valve on the lower portion of the cylinder below the piston adapted to admit air responsive to an upward suction stroke of the piston after the plug is formed in the tube and the tube is withdrawn from the soil and to close when the piston is moved downwardly to compress the admitted air, the piston being movable downwardly to increase the pressure of the admitted air, whereby the plug may be expelled from the tube, and a laterally extending arm secured to the lower portion of the cylinder for transmitting downward force to the cylinder and the tube.

3. A device for aerating the soil comprising an elongated pump cylinder, a piston in said cylinder, a piston rod connected to said piston and extending through the top end of the cylinder, an operating handle on said piston rod, a ground-penetrating tube secured axially to the other end of the cylinder in communication therewith, said tube being adapted to be forced into the soil and to form a plug of soil therein which is extracted when the tube is withdrawn from the soil, an air-admitting check valve on the lower portion of the cylinder below the piston adapted to admit air responsive to an upward suction stroke of the piston after the plug is formed in the tube and the tube is withdrawn from the soil and to close when the piston is moved downwardly to compress the admitted air, the piston being movable downwardly to increase the pressure of the admitted air, whereby the plug may be expelled from the tube, a laterally extending arm secured to the lower portion of the cylinder for transmitting downward force to the cylinder and tube, and a stop flange on the upper end portion of the tube to limit ground penetration thereof.

4. A device for aerating the soil comprising an elongated pump cylinder, a piston in said cylinder, a piston rod connected to said piston and extending through the top end of the cylinder, an operating handle on said piston rod, a ground-penetrating tube secured axially to the other end of the cylinder in communication therewith, said tube being adapted to be forced into the soil and to form a plug of soil therein which is extracted when the tube is withdrawn from the soil, an air-admitting check valve on the lower portion of the cylinder below the piston adapted to admit air responsive to an upward suction stroke of the piston after the plug is formed in the tube and the tube is withdrawn from the soil and to close when the piston is moved downwardly to compress the admitted air, the piston being movable downwardly to increase the pressure of the admitted air, whereby the plug may be expelled from the tube, a laterally extending arm secured to the lower portion of the cylinder for transmitting downward force to the cylinder and tube, and a stop flange on the upper end portion of the tube to limit ground penetration thereof, said check valve being located between said laterally extending arm and said stop flange and being in the same vertical plane as said arm, whereby it is protectively covered by said arm.

5. A device for aerating the soil comprising an elongated pump cylinder having a top wall, a piston in said cylinder, a piston rod connected to said piston and extending through the central portion of said top wall, yieldable stop means adjustably secured on the piston rod below said top wall and being resiliently engageable with said top wall to limit upward movement of the piston rod to a selected amount, whereby to regulate the maximum stroke of the piston, an actuating handle on the top end of said piston rod, a ground-penetrating tube secured axially to the other end of the cylinder in communication therewith, said tube being adapted to be forced into the soil and to form a plug of soil therein which is extracted when the tube is withdrawn from the soil, an air-admitting check valve on the lower portion of the cylinder below the piston adapted to admit air responsive to an upward suction stroke of the piston after the plug is formed in the tube and the tube is withdrawn from the soil and to close when the piston is moved downwardly to compress the admitted air, the piston being movable downwardly to increase the pressure of the admitted air, whereby the plug may be expelled from the tube, a laterally extending arm secured to the lower portion of the cylinder for transmitting downward force to the cylinder and tube, and a stop flange on the upper end portion of the tube to limit ground penetration thereof, said check valve being located between said laterally extending arm and said top flange and being in the same vertical plane as said arm and closely overlying same, whereby the check valve is protectively covered by said arm.

References Cited in the file of this patent

UNITED STATES PATENTS

| | | |
|---|---|---|
| 1,167,178 | Hill | Jan. 4, 1916 |
| 1,177,009 | Brunskill | Mar. 28, 1916 |
| 1,183,127 | Sheldon | May 16, 1916 |
| 1,653,994 | Emmet | Dec. 27, 1927 |
| 1,783,026 | Ober | Nov. 25, 1930 |
| 2,030,770 | Smith | Feb. 11, 1936 |
| 2,210,440 | Avary | Aug. 6, 1940 |
| 2,531,297 | Rose | Nov. 21, 1950 |
| 2,812,969 | Fornelius | Nov. 12, 1957 |

FOREIGN PATENTS

| | | |
|---|---|---|
| 296,139 | Great Britain | Aug. 30, 1928 |